(12) United States Patent
Shin

(10) Patent No.: US 6,351,960 B1
(45) Date of Patent: Mar. 5, 2002

(54) APPARATUS AND METHOD FOR PROTECTING MOTOR OF INVERTER REFRIGERATOR

(75) Inventor: Hyeon Jae Shin, Kimhae (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 09/650,598

(22) Filed: Aug. 30, 2000

(30) Foreign Application Priority Data

Sep. 1, 1999 (KR) .............................. 99-36879

(51) Int. Cl.⁷ ................................. F25B 1/00
(52) U.S. Cl. ............... 62/229; 62/126; 62/230; 62/228.3
(58) Field of Search ................ 62/229, 126, 230, 62/228.3, 228.1; 361/22, 24, 31, 33

(56) References Cited

U.S. PATENT DOCUMENTS

| 4,079,432 | A | * | 3/1978 | Godfrey | 361/22 |
| 4,196,462 | A | * | 4/1980 | Pohl | 361/33 |
| 4,286,303 | A | * | 8/1981 | Genheimer et al. | 361/24 |
| 4,653,285 | A | * | 3/1987 | Pohl | 62/126 |
| 5,035,118 | A | * | 7/1991 | Hara | 62/126 |
| 5,463,874 | A | * | 11/1995 | Farr | 62/126 |
| 5,488,834 | A | * | 2/1996 | Schwarz | 62/126 |
| 5,537,834 | A | * | 7/1996 | Farr | 62/126 |
| 5,557,938 | A | * | 9/1996 | Hanson et al. | 62/126 |
| 5,579,648 | A | * | 12/1996 | Hanson et al. | 62/126 |

* cited by examiner

Primary Examiner—Teresa Walberg
Assistant Examiner—Fadi H. Dahbour
(74) Attorney, Agent, or Firm—Ostrolenk, Faber, Gerb & Soffen, LLP

(57) ABSTRACT

The present invention relates to an apparatus and a method for protecting a motor of an inverter refrigerator comprising an OLP detect unit detecting operation of an OLP, and a power select unit selecting a power feed line in accordance with a detect signal inputted from the OLP detect unit, which is capable of driving properly the OLP in order to prevent damages on the motor due to overload or a rise in temperature of the motor with hysteresis of the OLP operation by preventing cutting off of the power feeding to a CPU when the OLP operates, accordingly the present invention can decrease claims from customers.

5 Claims, 2 Drawing Sheets

APPARATUS AND METHOD FOR PROTECTING MOTOR OF INVERTER REFRIGERATOR

BACKGROUND OF THE INVENTION

1. Field of the Invention

The present invention relates to an apparatus and a method for protecting a motor of an inverter refrigerator, in particular to the apparatus and method for protecting the motor of the inverter refrigerator which is capable of protecting the motor of the inverter refrigerator by preventing cutting off of a power feeding on a CPU (Central Processing Unit) when an OLP (Over Load Protector) operates and interrupts the power feed.

2. Description of the Prior Art

In general, in comparison with the conventional refrigerator adopting an ON-OFF method which regularly turns on/off a compressor, an inverter refrigerator adopts a technology which can optimize cooling air discharges and electric consumption of the inverter refrigerator in accordance with circumstances by controlling optimally operating hours and operating speed of a compressor of the inverter refrigerator.

FIG. 1 is a block diagram illustrating an apparatus for protecting a motor of the inverter refrigerator according to the conventional technology. As depicted in FIG. 1, the conventional apparatus comprises an OLP ( Over Load Protector) 10 preventing damages of the motor winding by cutting off a power feeding to the motor of the compressor in accordance with a rise in temperature of the motor winding and increase of load current when the compressor does not operate well due to a certain cause or overload occurs while the compressor operates, a SMPS (Switching Mode Power Supply) 20 providing an AC power source through the OLP 10, a detector 30 detecting the present state of the refrigerator, a CPU (Central Processing Unit) 40 driven by the power of the SMPS 20, processing a detecting signal of the detector 30 and outputting a control signal for controlling operation of the refrigerator, a driving unit 50 controlling operation of the motor of the compressor by receiving a compressor control signal outputted from the CPU 40, and a display unit 60 displaying state of the refrigerator in accordance with a state control signal outputted from the CPU 40.

The operation of the conventional apparatus for protecting the motor of the inverter refrigerator will now be described.

First, when the SMPS 20 is inputted the AC power source through the OLP 10 and feeds the AC power source to the CPU 40 as an operating power, and the CPU 40 is driven by the power fed by the SMPS 20 and controls generally various parts of the refrigerator. The CPU 40 is inputted the present state of the refrigerator through the detector 30 and operates the refrigerator by controlling the driving unit 50 in accordance with the present state of the refrigerator, and informs the present state of the refrigerator to a user by controlling the display unit 60. Herein, when the overload occurs on the motor of the compressor, the temperature of the winding of the motor rises or the overload increases, the motor of the compressor is protected by cutting off the power feeding to the motor by operating of the OLP 10 connected to a power input unit of the motor.

However, in the above-described conventional apparatus for protecting the motor of the inverter refrigerator, the CPU 40 can not store hysteresis of the past driving states of the inverter refrigerator because all the power feeding to the refrigerator is cut off by operating of the OLP 10. Accordingly, the conventional apparatus can not operate properly corresponding to the present operation of the OLP of the inverter refrigerator.

SUMMARY OF THE INVENTION

It is an object of the present invention to provide an apparatus and a method for protecting a motor of an inverter refrigerator which is capable of continuing power feeding to a CPU 40 by switching a power feed line and stopping operation of the motor of a compressor when an OLP 10 drives, and operating the motor of the compressor by feeding normal power passing through the OLP 10 when the OLP 10 is in the normal state.

In order to achieve the above object, the apparatus for protecting the motor of the inverter refrigerator of the present invention comprises the OLP 10 cutting off an AC power source inputted to the motor of the compressor in overload, an OLP detector 70 detecting operation/non-operation of the OLP 10, a power select unit 80 inputted the AC power source passing through the OLP 10 and the AC power source without passing through the OLP, a CPU (Central Processing Unit) 40 outputting a power select control signal to the power select unit 80 and a driving control signal for driving the motor after being inputted a detecting signal from the OLP detector 70, a SMPS (Switching Mode Power Supply) 20 feeding a driving power to the CPU 40 after receiving the power outputted from the power select unit 80 controlled in accordance with the power select control signal outputted from the CPU 40, a driving unit 50 controlling the operation of the motor of the compressor after receiving the driving control signal outputted from the CPU 40, a detector 30 outputting a detecting signal to the CPU 40 after detecting the present state of the refrigerator, and a display unit 60 displaying the state of the refrigerator in accordance with a state control signal outputted from the CPU 40.

The method for protecting the motor of the inverter refrigerator of the present invention judges whether the OLP 10 operates by using the OLP detect unit 70, in the result of the judging step when the OLP 10 operates, the CPU 40 is fed by the AC power source without passing through the OLP 10, the CPU 40 switches the power select unit 80 from one side P2 to the other side P1 by select-controlling the power feed line, in the result of the judging step when the OLP 10 does not operate, the CPU 40 switches the power select unit 80 from the side P1 to the other side P2 by select-controlling the power feed line.

DETAILED DESCRIPTION OF THE PREFERRED EMBODIMENT

Figure 1:
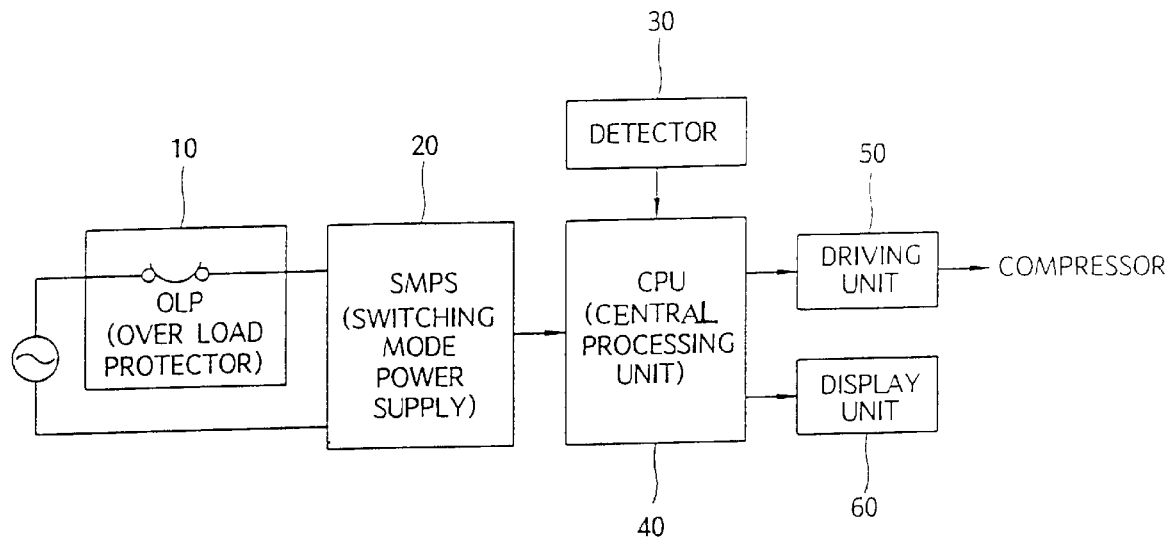
FIG. 1 is a block diagram illustrating an apparatus for protecting a motor of an inverter refrigerator according to the conventional technology.
Figure 2:
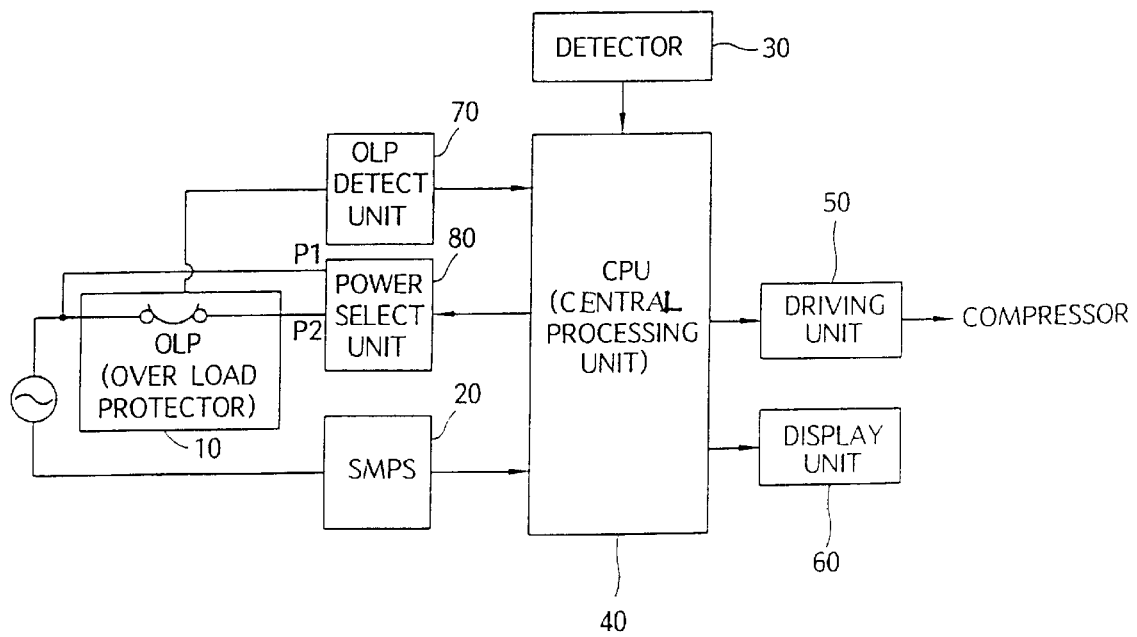
FIG. 2 is a block diagram illustrating an apparatus for protecting a motor of an inverter refrigerator according to embodiment of the present invention.

FIG. 2 is a block diagram illustrating an apparatus for protecting a motor of an inverter refrigerator according to embodiment of the present invention. As depicted in FIG. 2, the apparatus for protecting the motor of the inverter refrigerator of the present invention comprises an OLP 10 protecting the motor of a compressor by cutting off an AC power source fed to the motor of the compressor, an OLP detect unit 70 detecting operation/non-operation of the OLP 10, a SMPS (switching Mode Power Supply) 20 inputted the AC power source through the OLP 10, a detector 30 detecting the present state of the refrigerator, a CPU (Central Processing Unit) 40 driving a display unit 60 and a driving unit 50 by being inputted a detect signal from the OLP detect unit 70 and selectively controlling a power feed line, a power select unit 80 switching the power feed line in accordance with a power feed line select control signal of the CPU in order to feed the power to the CPU 40 when the OLP 10 operates, a driving unit 50 driving the motor of the compressor in accordance with a control signal outputted from the CPU 40, and a display unit 60 displaying the present state of the refrigerator in accordance with the control signal outputted from the CPU 40.

Figure 3:
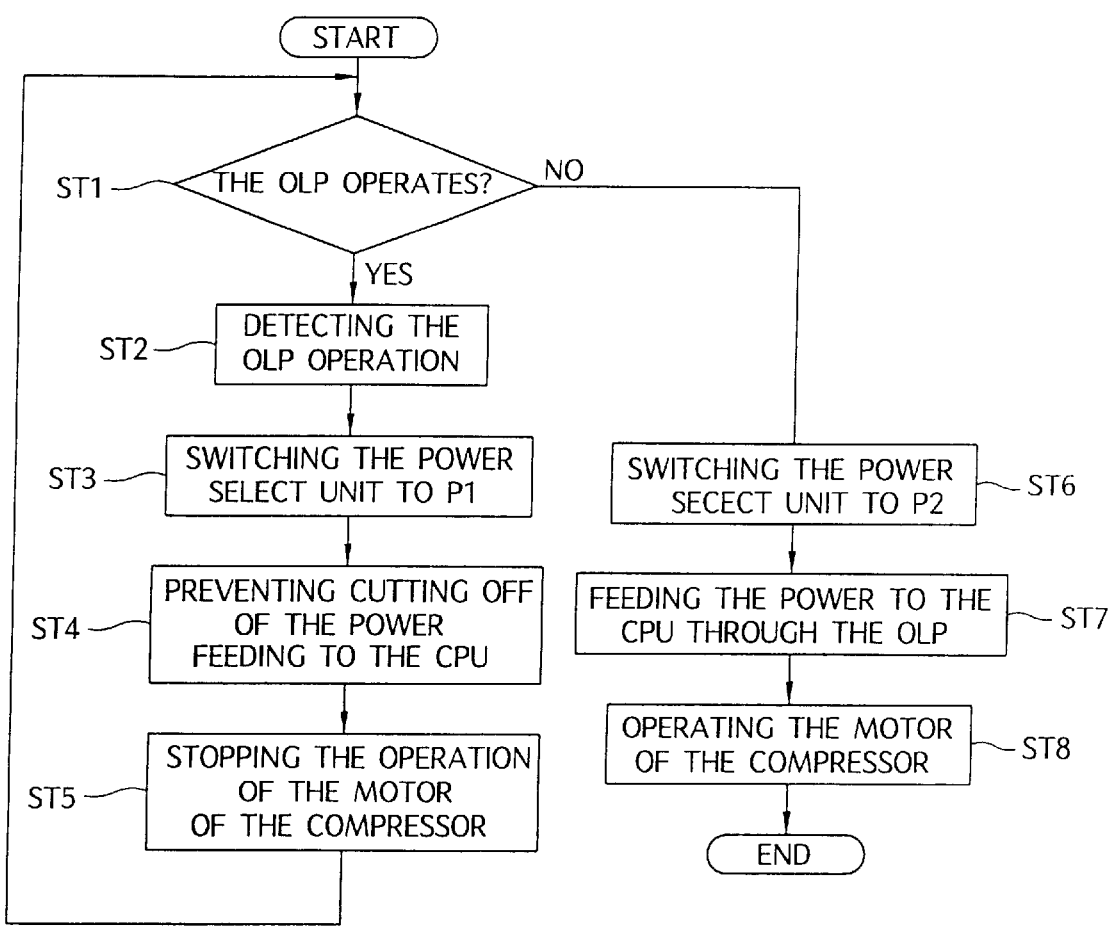
FIG. 3 is a flow chart illustrating a method for protecting a motor of an inverter refrigerator according to the present invention.

FIG. 3 is a flow chart illustrating a method for protecting the motor of the inverter refrigerator according to the present invention. The method for protecting the motor of the inverter refrigerator comprises a judging step ST1, ST2 judging through the OLP detect unit 70 whether the OLP 10 operates, a switching step ST3 switching the power select unit 80 to one side P1 in order to feed the AC power source to the CPU 40 without passing through the OLP 10 when the OLP 10 drives in the result of the judging step ST1, ST2, a preventing step ST4 preventing cutting off of the power fed to the CPU 40 when the OLP 10 operates, a stopping step ST5 stopping the operation of the motor of the compressor until the OLP 10 returns to the normal state, a switching step ST6 switching the power select unit 80 to the other side P2 in order to feed the power to the CPU 40 passing through the OLP 10 when the OLP 10 returns to the normal state in the result of the judging step ST1, ST2, a driving step ST7, ST8 driving the motor of the compressor after feeding the power to the motor through the OLP 10 in the result of the switching step ST6.

The operation of the apparatus for protecting the motor of the inverter refrigerator will now be described.

First, when the AC power source inputted through the OLP 10 is fed to the CPU 40 through the SMPS (switching Mode Power Supply) 20, the CPU 40 is driven by the power feeding of the SMPS 20, and controls generally various parts of the refrigerator. In other words, the CPU 40 is inputted the present state of the refrigerator through the detector 30, controls the driving unit 50 in accordance with the present state of the refrigerator, operates the refrigerator, and informs the present state of the refrigerator to the user by controlling the display unit 60. Herein, the OLP 10 including a bimetal (or contact) serial-connected to a power input of the motor which is adhered to a coil of the motor or is serial-connected to the power input, prevents damages of the motor winding by cutting off the power feeding to the motor of the compressor in accordance with a rise in temperature of the motor winding or increase of the overload current generated by the overload of the motor of the compressor. Herein, the OLP detect unit 70 connected to the OLP 10 detects operation/non-operation of the OLP 10, and transmits the detect signal in accordance with the operation of the OLP 10 to the CPU 40 when the OLP 10 operates. Then, the CPU 40 switches the power select unit 80 to the one side P1 in order to prevent cutting off of the power feeding to the CPU 40 due to the operation of the OLP 10 and continue the power feeding to the CPU 40, and stops the operation of the motor of the compressor until the OLP 10 returns to the normal state. In addition, when the OLP 10 returns to the initial state and is closed, the OLP detect unit 70 detects it and transmits the detect signal to the CPU 40, after that the CPU 40 controls the power select unit 80 so as to be switched to the other side P2, is fed the power through the OLP 10, and drives the motor of the compressor normally. In other words, the apparatus for protecting the motor of the inverter refrigerator of the present invention continues the power feeding to the CPU 40 and stops the operation of the motor of the compressor when the OLP 10 operates. And, the power select unit 80 is switched from the one side P1 to the other side P2 before the voltage charged on a capacitor included in the SMPS 20 is discharged in order to feed the power normally passing through the OLP 10.

As described above, the apparatus of the present invention is capable of preventing cutting off of the power feeding to the CPU 40 when the OLP 10 operates, and operating properly corresponding to the operation of the OLP 10 by managing hysteresis of the operation of the OLP 10.

What is claimed is:

1. An apparatus for protecting a motor, comprising:
    an OLP (Over Load Protector) cutting off an AC power source inputted to the motor;
    an OLP (Over Load Protector) detect unit detecting operation/non-operation of the OLP;
    a power select unit selecting the AC power from the AC power source after passing through the OLP or AC power from the AC power source without passing through the OLP in accordance with a power select control signal;
    a CPU (Central Processing Unit) outputting the power select control signal to the power select unit and a driving control signal for driving the motor in accordance with a detect signal from the OLP detect unit; and
    a SMPS (Switching Mode Power Supply) feeding a driving power to the CPU after receiving the power selected by the power select unit controlled in accordance with the power select control signal outputted from the CPU.

2. The apparatus according to claim 1, wherein the apparatus further comprises a driving unit controlling the operation of the motor after receiving the driving control signal outputted from the CPU.

3. The apparatus according to claim 1, wherein the apparatus is applied to a refrigerator and further comprises a detector outputting a detect signal to the CPU after detecting the present state of the refrigerator.

4. The apparatus according to claim 1, wherein the apparatus is applied to a refrigerator and further comprises a display unit displaying the state of the refrigerator in accordance with a state control signal outputted from the CPU.

5. A method for protecting a motor, comprising:
    judging whether an OLP (Over Load Protector) operates; and
    controlling a power select unit in order to prevent cutting off of power feeding to a CPU by detecting the operation of the OLP (Over Load Protector), wherein the controlling step further comprises the steps of;
    feeding a driving power generated from an AC power source to the CPU without passing through the OLP in accordance with a control of the CPU when the OLP operates; and
    feeding a driving power generated from the AC power source to the CPU after passing through the OLP in accordance with a control of the CPU when the OLP does not operate.

* * * * *